July 29, 1930.　　　　D. I. REITER　　　　1,771,901
FASTENING DEVICE
Filed Jan. 28, 1927
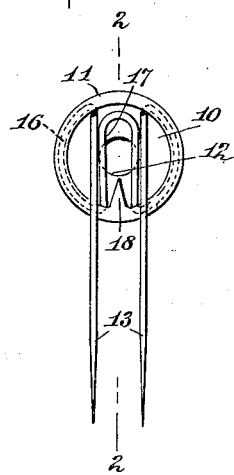
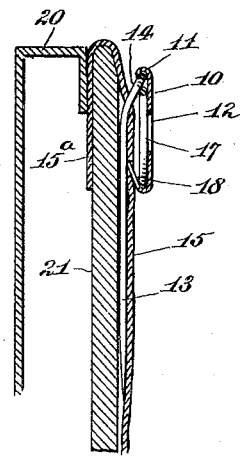
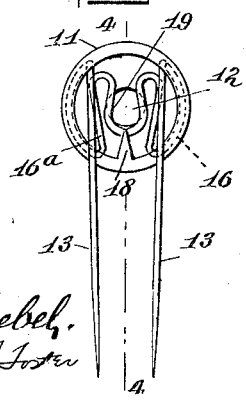
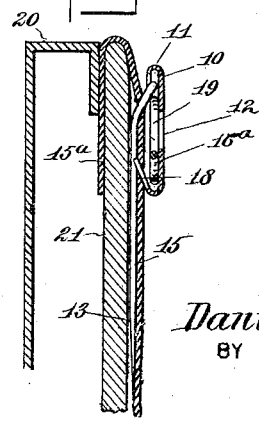
INVENTOR
Daniel I. Reiter
BY
ATTORNEY Patented July 29, 1930

1,771,901

UNITED STATES PATENT OFFICE

DANIEL I. REITER, OF BROOKLYN, NEW YORK

FASTENING DEVICE

Application filed January 28, 1927. Serial No. 164,284.

The present invention is concerned with the provision of a fastening device which may have a wide range of utility in the arts, which is primarily adapted for securing dust covers to the upholstery of automobile seats and backs.

Since the advent of steel body construction in automobile vehicles, it has become common practice to secure the edges of the velour seat coverings between the steel body frame and a plate which is connected to the frame by concealed securing devices. These plates are generally of some hard substance unsuitable for the reception of nails or similar securing devices. In consequence the problem of attaching a dust cover, such, for instance as an ordinary cretonne cover over the upholstery has become a serious one. The covers themselves are cheap enough, but it is very difficult to find any way of attaching them.

In accordance with the present invention I have provided a fastening device adapted to be attached directly to the velour or to the outer covering of the upholstery, said fastening device carrying one element of a separable fastener, and the other element of the fastener being carried by the dust cover.

Preferably the fasteners which I utilize include pin portions adapted to pass through the velour and lie between the velour and the hard backing plate. Connected to the unpointed ends of the pins are plate portions which overlie the outer surface of the velour and carry either the male or female elements of snap fasteners. The plates may also be provided with prongs which enter the velour and coact with the pins to prevent twisting or slipping of the fastening devices from proper position.

Objects of the invention are to provide a fastener of the general character outlined above which will be of simple, practical construction, rugged, durable and efficient in use, neat and attractive in appearance and well suited to the requirements of economical manufacture and rapid installation.

The fastener of the present invention is primarily designed as an improvement over the fastener disclosed in my Reissue Patent No. 16,660, dated June 21, 1927, which is concerned principally with the provision of fastening devices which constitute male elements of snap fastener combinations.

The device preferably includes a flanged cap having an opening therein through which a stud member is adapted to be inserted and having a single length of wire bent to provide penetrating pins, a head portion which is engaged with the cap and a spring portion underlying the opening to be spread apart by the stud and to engage the neck of the stud. Thus a single length of wire performs a triple function.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Figure 1 is a view in rear elevation of a snap fastener embodying the present invention.

Figure 2 is a vertical sectional view therethrough showing the same applied to the seat cover of an automobile, this view being taken on the line 2—2 of Figure 1.

Figure 3 is a view similar to Figure 1, but showing a modification.

Figure 4 is a view similar to Figure 2, but taken on the line 4—4 of Figure 3.

Referring first to Figures 1 and 2 of the drawings I have shown a fastener which includes a circular cap 10 formed with a rearwardly and inwardly rolled flange 11 and having a central opening 12 therein through which the stud of a male fastener element is adapted to be inserted. A single length of wire is bent to provide attaching pins, a head portion engaged by the flange and a pair of spring arms arranged adjacent the opening adapted to coact with an inserted stud. The pins 13 are defined by the pointed ends of the wire, these pins being arranged in parallelism and offset from the plane of the plate 10 by an inclined or humped portion 14 at their upper ends, thus providing clearance between the plate and pins for the reception of fabric 15 when the fastener element is applied. The wire from the upper ends of the pins is thence curved outwardly and downwardly, providing a pair of arcuate runs 16 which underlie the flange 11 at opposite sides. The intermediate portion of the wire is then bent upwardly defining a substantially U-shaped member lying against the inner face of the plate and including a pair of arms 17 exposed through the opening 12. As a stud member (not shown) is inserted through the opening 12 the arms 17 are sprung apart and then resiliently closed on the neck of the stud.

An upwardly and outwardly struck spur 18 is integral with the bottom of the cap flange, this spur lying between the arms 13 and preventing relative rotary movement of the wire and the cap.

In Figure 2 I have shown an automobile frame 20 and an upholstery fabric 15 having one edge 15ª bent over a stiff plate 21 and clamped between the plate and the frame 20. The fastener of the present invention is peculiarly adapted to be associated with the upholstery fabric 15 and to co-act with a stud fastener on a dust cover. When the fastener is inserted the pins 13 penetrate the fabric and lie between the fabric and the plate 21. The cap 10 lies on the outside of the fabric and the spur 18 entering the fabric prevents either accidental retrograde movement of the fastener or twisting movement of the fastener in the fabric.

The fastener of Figures 3 and 4 is similar to the one above described, except that the intermediate portion of the wire which connects with the arcuate runs 16 is bent first upwardly at 16ª and then downwardly to provide a U-shaped member 19, the arms of which underlie the opening. The provision of the extra runs of wire at 17 lends adequate resiliency to the stud engaging portion 19 and lessens the danger of permanently distorting the wire by the repeated insertion and withdrawal of studs.

Various changes and alterations might be made in the general form and arrangement of parts described without departing from the spirit or scope of the appended claims.

I claim:

1. A fastener of the class described including a flanged cap having an opening therein, a length of wire bent to provide portions underlying the flange, pin portions disposed in spaced parallel relationship to the cap and spring arm portions underlying the opening and adapted to be spread apart as a stud member is inserted through the opening, said arms being united at one end and at their other ends forming continuations of the arcuate runs of the wire underlying the flange.

2. A fastener of the class described including a flanged cap having an opening therein, a length of wire bent to provide portions underlying the flange, pin portions disposed in spaced parallel relationship to the cap and spring arm portions underlying the opening and adapted to be spread apart as a stud member is inserted through the opening, said arms being united at one end and at their other ends forming continuations of the arcuate runs of the wire underlying the flange, the other ends of the arcuate runs connecting with the pins.

DANIEL I. REITER.